United States Patent
Tashman et al.

(10) Patent No.: US 11,232,368 B2
(45) Date of Patent: Jan. 25, 2022

(54) SYSTEM FOR PREDICTING EQUIPMENT FAILURE EVENTS AND OPTIMIZING MANUFACTURING OPERATIONS

(71) Applicant: Accenture Global Solutions Limited, Dublin (IE)

(72) Inventors: Zaid Tashman, San Francisco, CA (US); Paul Hofmann, San Jose, CA (US); Teresa Sheausan Tung, Tustin, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 68 days.

(21) Appl. No.: 16/792,696

(22) Filed: Feb. 17, 2020

(65) Prior Publication Data
US 2020/0265331 A1    Aug. 20, 2020

Related U.S. Application Data

(60) Provisional application No. 62/808,110, filed on Feb. 20, 2019.

(51) Int. Cl.
  *G06N 7/00*     (2006.01)
  *G06N 20/00*    (2019.01)
  (Continued)

(52) U.S. Cl.
  CPC .......... *G06N 7/005* (2013.01); *G05B 23/024* (2013.01); *G05B 23/0283* (2013.01);
  (Continued)

(58) Field of Classification Search
  CPC ........ G06N 7/005; G06N 20/00; G06N 20/10; G06N 5/003; G06N 3/0445; G06N 20/20; G05B 23/0283; G05B 23/024
  See application file for complete search history.

(56) References Cited

U.S. PATENT DOCUMENTS

2004/0186927 A1*  9/2004  Eryurek .............. G06Q 10/063
                                                       710/12
2008/0288321 A1*  11/2008  Dillon ............. G06Q 10/06311
                                                       705/7.13
(Continued)

FOREIGN PATENT DOCUMENTS

EP    3 220 331 A1    9/2017
GB    2547993 A       9/2017

OTHER PUBLICATIONS

Givan, B., et al., "An Introduction to Markov Decision Processes," dated at least as early as Mar. 17, 1997, pp. 1-23, MDP Tutorial.
(Continued)

*Primary Examiner* — Roy Y Yi
*Assistant Examiner* — Geoffrey T Evans
(74) *Attorney, Agent, or Firm* — Crowell & Moring LLP

(57) ABSTRACT

A system receives sensor data from sensing parameters of a piece of factory equipment. The system includes a first model to generate predicted degradation states of the piece of factory equipment by being trained to generate a stochastic degradation model for classification of the predicted degradation states of a particular asset. The system includes a second model to which the predicted degradation states are provided. The second model trained to generate a covariate indicative of a failure condition of the piece of factory equipment. The system may supply the covariate to the first model to generate predicted degradation states compensated with the covariate. From the predicted degradation states compensated with the covariate a policy of a maintenance action may be generated with the system to optimize life expectancy of the piece of factory equipment. The system may adjust operation of the piece of factory equipment based on the maintenance action.

20 Claims, 11 Drawing Sheets

(51) Int. Cl.
*G06N 20/20* (2019.01)
*G05B 23/02* (2006.01)
*G06N 20/10* (2019.01)
*G06N 5/00* (2006.01)
*G06N 3/04* (2006.01)

(52) U.S. Cl.
CPC .............. *G06N 20/00* (2019.01); *G06N 20/20* (2019.01); *G06N 3/0445* (2013.01); *G06N 5/003* (2013.01); *G06N 20/10* (2019.01)

(56) References Cited

U.S. PATENT DOCUMENTS

| | | | | |
|---|---|---|---|---|
| 2017/0109646 | A1* | 4/2017 | David | H01L 22/12 |
| 2017/0139408 | A1* | 5/2017 | Moyne | G05B 23/0243 |
| 2019/0155672 | A1* | 5/2019 | Wang | G06K 9/6284 |
| 2020/0058081 | A1* | 2/2020 | Saneyoshi | G06Q 50/04 |
| 2020/0103857 | A1* | 4/2020 | Wynne | G06N 20/00 |
| 2020/0226401 | A1* | 7/2020 | Rajagopal | G06N 7/005 |
| 2020/0301408 | A1* | 9/2020 | Elbsat | G05B 23/0291 |
| 2020/0311559 | A1* | 10/2020 | Chattopadhyay | G06N 5/003 |
| 2020/0387818 | A1* | 12/2020 | Chan | G06F 17/18 |

OTHER PUBLICATIONS

Kamalzadeh, H., et al., "POMDP: Introduction to Partially Observable Markov Decision Processes," dated Dec. 8, 2019, pp. 1-9, Southern Methodist University, Dallas, Texas.

Extended European Search Report, dated Jun. 24, 2020, pp. 1-12, issued in European Patent Application No. 20158185.7, European Patent Office, Munich, Germany.

Gebraeel, Nagi Z., et al., "A Neural Network Degradation Model for Computing and Updating Residual Life Distributions," Jan. 1, 2008, pp. 154-163, vol. 5, No. 1, IEEE Transactions on Automation Science and Engineering, IEEE Service Center, New York, NY XP011197292.

Aissani, N., et al., "Dynamic scheduling of maintenance tasks in the petroleum industry: A reinforcement approach," dated Oct. 1, 2009, pp. 1089-1103, vol. 22, No. 7, Engineering Applications of Artificial Intelligence, Pineridge Press, Swansea, GB, XP026602747.

* cited by examiner

# US 11,232,368 B2

SYSTEM FOR PREDICTING EQUIPMENT FAILURE EVENTS AND OPTIMIZING MANUFACTURING OPERATIONS

PRIORITY CLAIM

This application claims priority to U.S. Provisional Patent Application Ser. No. 62/808,110, filed Feb. 20, 2019, which is entirely incorporated by reference.

BACKGROUND

Field

This application generally relates to maintenance of equipment. In particular, this application describes a method and system for predicting equipment failure events and optimizing manufacturing operations.

Description of Related Art

Large industrial operations typically rely on a complex assortment of mechanical equipment and control systems for controlling and monitoring the performance of the mechanical equipment. To maximize production capacity, the equipment may be operated continuously and during extreme conditions. Operating the equipment under such conditions requires constant monitoring of the equipment to verify that the equipment is operating within its safety margins.

To facilitate monitoring, the equipment may include various sensors to measure, for example, pressures, temperatures, speeds, etc. A control system may continuously monitor the sensor data and may generate a user interface that allows an operator to view data indicative of the performance of the equipment.

However, despite constant monitoring, unexpected equipment failure may still occur, which may lead to production downtime. Such unplanned downtime can result in millions of dollars in production losses and unpredictability in meeting supply demands.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

The embodiments described below overcome the problems described above by providing a system for predicting failure events and optimizing discrete manufacturing processes using reinforcement learning. As will be described in more detail below, the system includes health inference circuitry configured to predict the time of occurrence of rare failure events in mechanical factory equipment by learning from historical observations and past failure events collected from multiple pieces of factory equipment over time.

Figure 1:
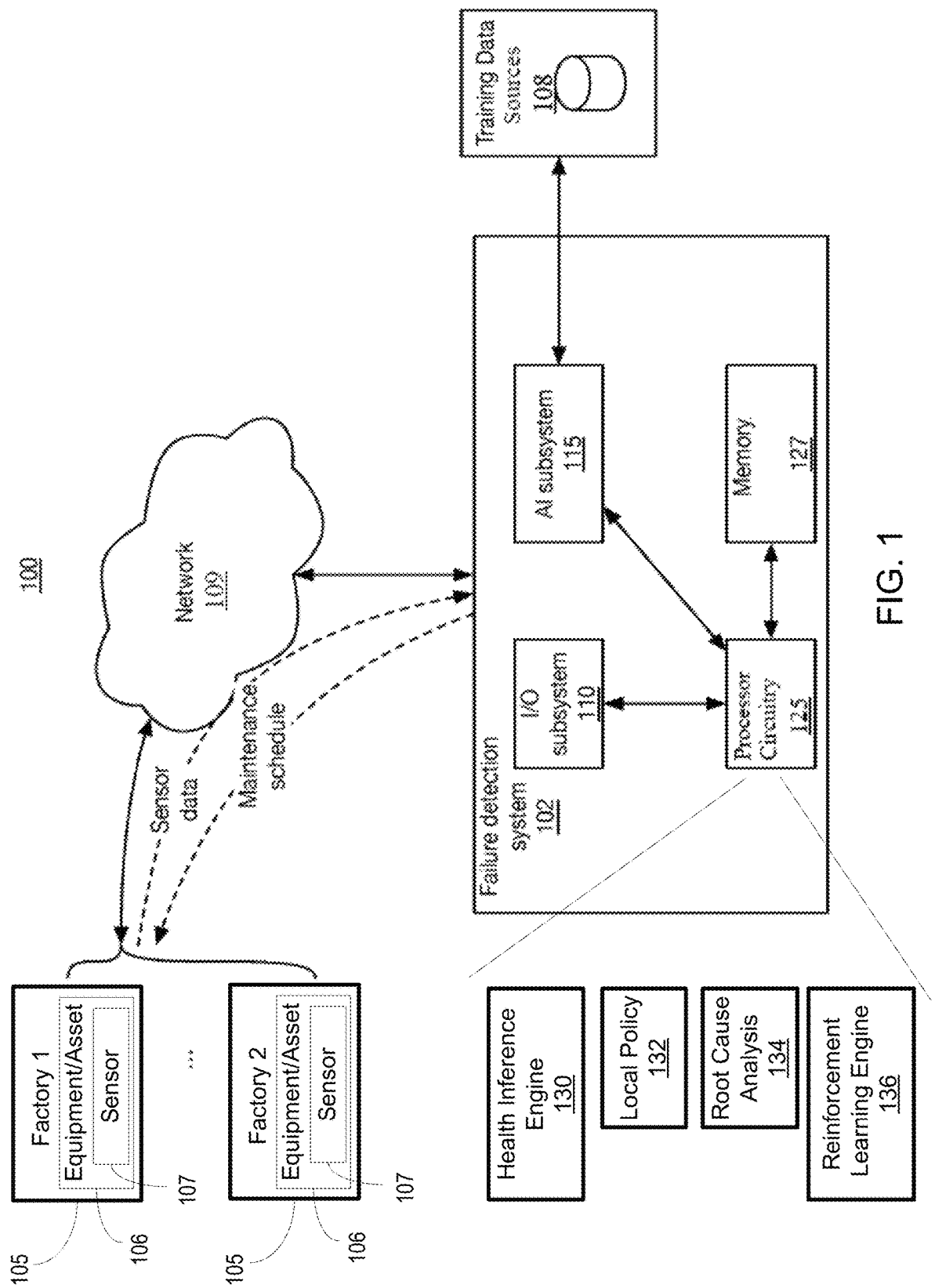
FIG. 1 illustrates an exemplary environment that includes various systems/devices and a failure detection system (FDS).

FIG. 1 illustrates an exemplary environment 100 that includes various systems/devices that facilitate predicting equipment/asset failure events and optimizing manufacturing operations. Exemplary systems/devices of the environment 100 include a failure detection system (FDS) 102, one or more factories 105 that includes equipment/assets 106 having sensors 107, and training data source(s) 108.

The various entities of the environment 100 may communicate with one another via a network 109, such as the Internet and may include circuitry correspond to computer systems such as an Intel®, AMD®, or PowerPC® based computer system or a different computer system and can include application specific computer systems. The computer systems may include an operating system, such as Microsoft Windows®, Linux, Unix® or other operating system. Any terminals described herein may be desktop PCs and/or mobile terminals.

Each factory 105 may include a variety of factory equipment/assets 106 of different makes and models. Each asset 106 may include one or more sensors 107 that may be strategically arranged around the asset 106 to measure various parameters of the asset 106. For example, a first sensor may measure the temperature of a drive motor, a second sensor may measure the output pressure of a pump, a third sensor may measure the temperature of the pump, and a fourth sensor may measure a flow rate of the pump. Other sensors may be provided for measuring other characteristics of the asset.

Each sensor 107 may be configured to periodically sample a respective parameter of the asset and to communicate the information as sample data directly or indirectly to the FDS 102. For example, each sensor 107 may wirelessly communicate with or be wired to a local system near the asset 106 that stores sensor data. The local system may periodically communicate the information to the FDS 102. In other implementations, the sensors 107 may communicate sensor data directly to the FDS 102, or to a remotely located system for communication to the FDS 102.

Some factories 105 may utilize the same make and model of equipment/assets 106 as others. This advantageously increases the size of the pool of equipment from which sensor data may be obtained.

The training data source(s) 108 may correspond to one or more systems that store historical sensor information and operational information related to equipment/assets 106. In some instances, the state of the asset 106 is associated with the sensor data (e.g., whether the asset is new, how old the asset is, when the asset failed, etc.). Information from the training data source(s) 108 may be communicated to the FDS 102 via an API such as a webserver API, a SOAP-based web service, a RESTful API, and/or a different type of API and aggregated. As will be described further below, the FDS 102 may utilize the information in the training data source(s) 108 to facilitate training AI subsystems of the FDS 102.

The FDS 102 may include processor circuitry 125, such as a central processing unit (CPU), input/output (I/O) subsystem 110, and an AI subsystem 115. The FDS 102 may include other subsystems.

It is contemplated that the I/O subsystem 110, AI subsystem 115, and any other subsystem referenced herein may include circuitry corresponding to a stand-alone computer system such as an Intel®, AMD®, or PowerPC® based computer system or a different computer system and can include application specific computer systems. The computer systems may include an operating system, such as Microsoft Windows®, Linux, Unix® or other operating system. It is also contemplated that operations performed on the various subsystems may be combined into a fewer or greater number of subsystems to facilitate speed scaling, cost reductions, and other operational factors.

The I/O subsystem 110 of the FDS 102 includes one or more input, output, or input/output interfaces and is configured to facilitate communications with entities outside of the FDS 102. In this regard, the I/O subsystem 110 may be configured to dynamically determine the communication methodology utilized by entities of the environment 100 and may communicate information to the entities with an interface that uses a determined communication methodology. For example, the I/O subsystem 110 may determine that a first entity utilizes a RESTful API and may, therefore, communicate with the entity using an interface that uses a RESTful communication methodology.

The I/O subsystem 110 may implement a web browser to facilitate generating one or more web-based interfaces one or more terminals, through which users of the FDS 102, factory 105, and/or other systems may interact with the FDS 102. The web browser may implement a web services interface to facilitate automating some of the web-based functionality via circuitry such as a computer. For example, one or more of the entities of the environment 100 may utilize the web services interfaces to access information stored by the FDS 102 and/or to communicate information to the FDS 102.

The AI subsystem 115 may correspond to circuitry, such as hardware, specifically configured to facilitate the training of generative graphical models such as Hidden Markov Models (HMM), Mixed Membership Models (MMM), Latent Dirichlet Allocation, Kalman Filter, Particle Filter, and/or a combination of these. The AI subsystem 115 may be further configured to implement various supervised, unsupervised, and reinforcement-learning machine learning models. The machine learning models may be based on a recurrent neural network (RNN) such as a network of long short-term memories (LSTM).

The processor circuitry 125 may execute instruction code stored in a memory 127 for coordinating activities performed between the various subsystems. The processor circuitry 125 may correspond to a stand-alone computer system such as an Intel®, AMD®, or PowerPC® based computer system or a different computer system and can include application specific computer systems. The computer systems may include an operating system, such as Microsoft Windows®, Linux, Unix® or other operating system.

The processor circuitry 125 includes health inference engine 130, local policy engine 132, root cause analysis engine 134 and reinforcement learning engine 136. Such engines may circuitry performing logic formed by a combination of hardware and executable code stored in memory that provides the described functions. In other examples fewer or additional engines may be illustrated to depict the functionality of the processor circuitry 125, as described herein.

The health inference engine 130 may utilize statistical inference methods, such as Bayesian inference, in association with a machine learning (ML) model, such as generative graphical models such as Hidden Markov Models (HMM), Mixed Membership Models (MMM), Latent Dirichlet Allocation, Kalman Filter, Particle Filter, and/or a combination of these models/schemes) to infer the state of the stochastic degradation or failure process of the assets from observations. These models "learn" from historical data using unsupervised learning techniques. The observations may be compensated with predicted failure events. Examples of such predicted failure events include loss of sterility in an aseptic container filling process. The models may be included in the AI subsystem 115.

The local policy engine circuitry 132 may specify one or more optimal maintenance action(s) to take on each asset, such as each piece of factory equipment, at any given point in time based on predicted degradation states compensated with predicted failure events. The local policy engine 132 may be operationally derived from a value function to provide possible maintenance actions. For example, the local policy engine circuitry 132 may generate a numerical value for each possible maintenance action which may be taken at each time step. This value function is a function of the probability of equipment failure and can be represented by neural network(s), multi-dimensional hyper-planes, or a decision tree.

The root cause analysis engine 134 may be configured to identify probable root-cause of a failure event and its relationship to the data observed. The root cause analysis engine 134 may implement a "two-stage" method and a "joint" method, as described herein. In implementing the "two-stage" method, the root-cause analysis circuitry may sample the ML model of the health inference engine 130, that describes the stochastic degradation process, and then fit a root cause model, such as a proportional hazards model, to the fully labeled sampled data to generate predicted degradation states compensated with a predicted failure event. In implementing the "joint" method, the root-cause analysis circuitry may model the overall likelihood of both the sequential/longitudinal data as the ML model and the failure times jointly to arrive at generated predicted degradation states compensated with predicted failure events. The parameters output by the root cause model along with their uncertainty estimates indicate the effects of each covariate on the expected failure time. The covariates may be used by the root cause analysis engine 134 to implement the ML model in the "joint method," or may be supplied as feedback to the ML model such that compensated degradations states are generated.

The reinforcement learning engine 136 may be configured to generate an optimal maintenance schedule 360 for maintaining assets by maximizing an objective function (e.g. throughput, yield, profits, rewards, utility, and/or other ascertainable parameters) or minimizing cost. The reinforcement learning engine 136 may attain the optimal schedule using inputs from the local policy engine circuitry 132, the environment (i.e., the factory), and any exogenous information describing any information that arrives to the reinforcement learning engine exogenously between the current time and the last time an action was taken. This exogenous information represents sources of randomness introduced to the system over time.

Figure 2:
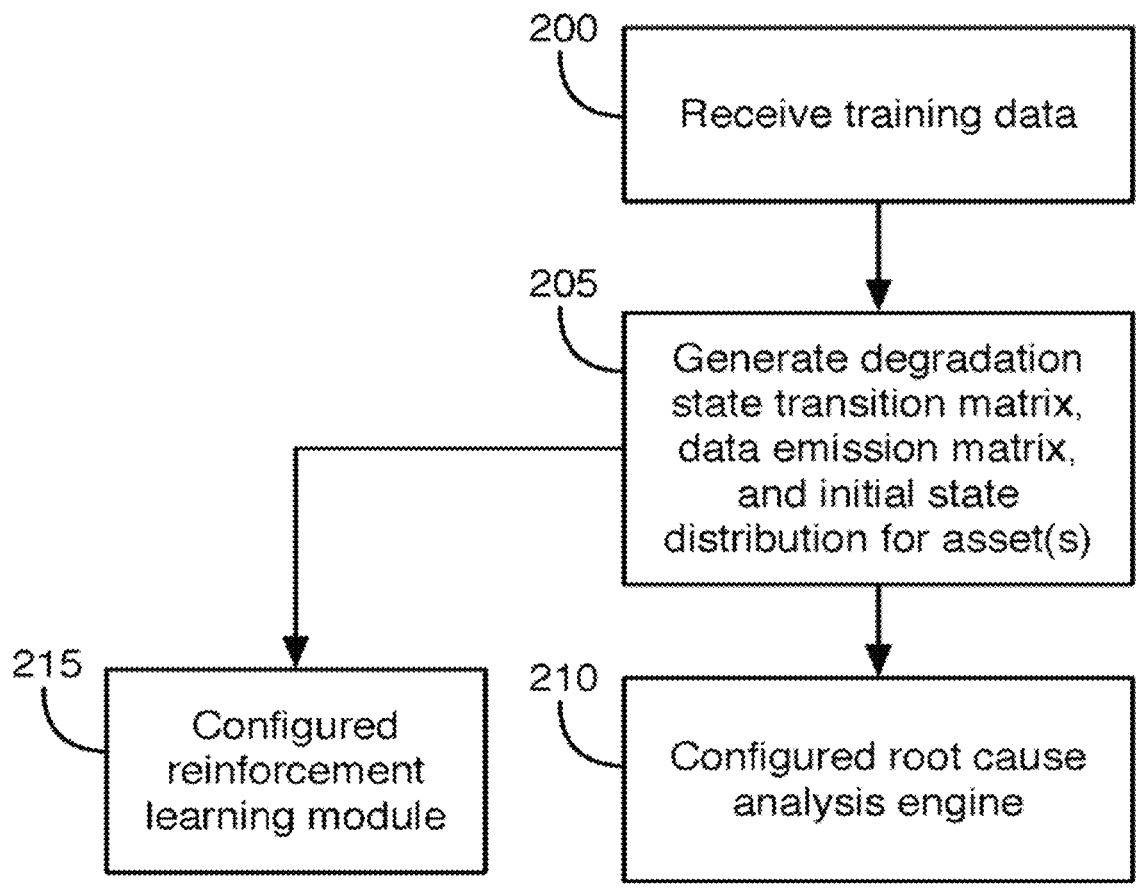
FIG. 2 illustrates various exemplary operations performed by the failure detection system (FDS).

FIG. 2 illustrates various exemplary operations performed by the processor circuitry 125, AI subsystem 115, and/or other circuitry of the FDS 102 for providing a method for predicting failure events and optimizing discrete manufacturing operations. In this regard, the operations may be implemented via instruction code stored in non-transitory computer readable media, such as memory 127, that may reside within the subsystems configured to cause the respective subsystems to perform the operations illustrated in the figures and discussed herein. The operations are best understood with reference to FIGS. 3-9.

Referring to FIG. 2, at operation 200, training data that may include historical sample data taken from various assets is received by the FDS 102. In some instances, the ingested data may be pre-processed by performing operations such as up-sampling, down-sampling, deduplication, removal of anomalous sample data, histogram computation, binning, discretization, . . . etc.

Figure 3:
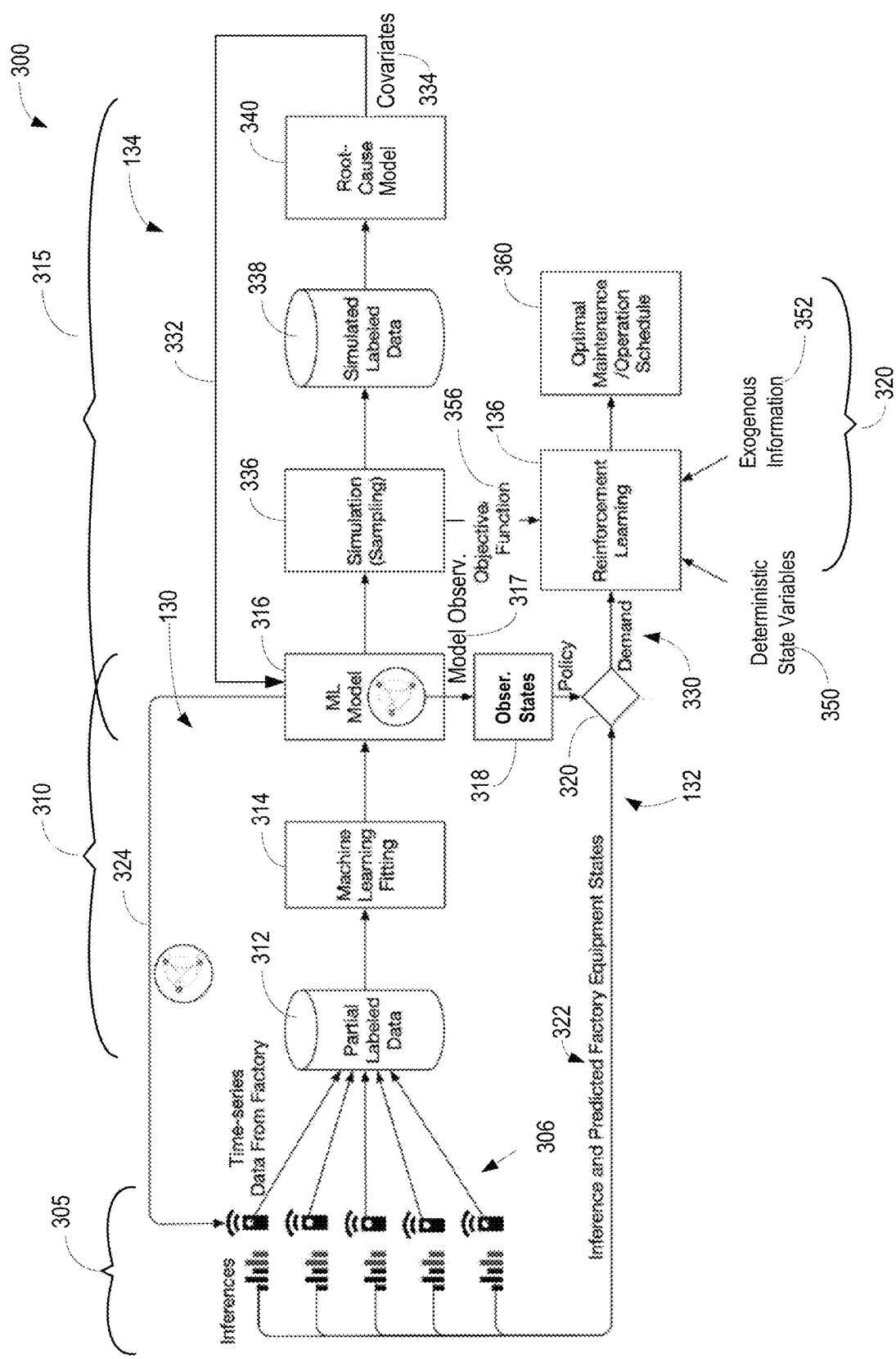
FIG. 3 is a block diagram example of a failure detection system.

FIG. 3 is a block diagram example of a failure detection system 300. Referring to section 305 of FIG. 3, historical sensor data 306 associated with assets in one or more factories 105 (FIG. 1) is received. The sensor data 306 may include historical time series data collected over the life of different assets as well as records of past failure events.

At operation 205, a degradation state transition matrix, a data emission distribution, and initial state distribution are generated for each piece of factory equipment represented by respective sensor data 306, or sample data. This is further illustrated in section 310 of FIG. 3, which represents an example of health inference circuitry 130. In this example, the health inference circuitry 130 includes identification and analysis of partial labeled data with partial labeled data circuitry 312. The partial labeled data circuitry 312 may include logic to estimate model parameters and fill in labels for identify sensor data having ambiguous labels due to, for example sensor data 306 being weakly labeled, having omitted labels or having multiple labels. The health inference circuitry 130 may also include machine learning fitting circuitry 314 to measure and improve accuracy regarding how well one or more machine learning (ML) model circuitry 316 associates similar sensor data to sensor data on which the ML model circuitry 316 was trained. The ML model 316 may output model observations, or observations 317 indicating one or more degradation states of the particular piece of equipment.

Local policy engine 132 may be in communication with the ML model circuitry 314 and may provide one or multiple policies specifying optimum maintenance actions at given points in time (time step) on each asset, such as each piece of factory equipment. Thus, each asset, or piece of factory equipment, may have different policy(s) tailored to it according to attributes of the respective asset or piece of factory equipment. In the example of FIG. 3, the local policy engine 132 includes observation states circuitry 318 and combiner circuitry 320.

The observation states circuitry 318 may derive one or more possible policies or maintenance functions for a particular asset or piece of factory equipment based on the observation information 317 received from the ML model 316. The policy(s) may be derived from value functions, as described herein, that identify possible maintenance functions (or maintenance actions) in accordance with the probability of failure of the respective corresponding asset. For example, the observation states circuitry 318 may include partially observable Markov decision process (POMDP) solve capability. Thus, the observation states circuitry 318 may receive observations 317 based on model operation of the ML model circuitry 314, and perform probabilities of possible failures for the asset or piece of factory equipment, in order to create policies in the form of maintenance actions for each piece of equipment. The value functions may be representative of different maintenance actions and may represent a probability distribution of possible failure events of the respective piece of factory equipment, or asset at different time steps of the equipment's operation. In other words, the maintenance actions may change according to the time steps of predicted possible failure events in the probability distribution.

At each time step, the local policy engine 132 is confronted with a maintenance decision with a number alternative (actions) to choose from. The local policy engine 132 is configured to choose the best action(s) based on not only the immediate effects but also the long-term effects on the asset, which may not be transparent or clear. Sometimes maintenance actions with poor immediate effects can have better long-term ramifications. As described herein, an "optimal" policy is a policy that provides an advantageous or desirable tradeoff between the immediate effects and the future rewards of following particular maintenance actions.

The choice of an optimal policy is difficult because there is uncertainty about the future. For example, sensors are not always placed in the optimum location on the equipment, thereby providing sensor data that may make the health inference of the health state of the factory equipment noisy and full of uncertainty. There is also dynamic uncertainty about how the equipment will evolve in the future and how the operators will use the factory equipment in the future. The goal of the local policy engine 132 is to determine one or more optimum maintenance action(s) to take on a specific piece of factory equipment at any given point in time (time step) given the possibly uncertain current health state and the forecasted future health state of that specific piece of factory equipment.

Figure 4:
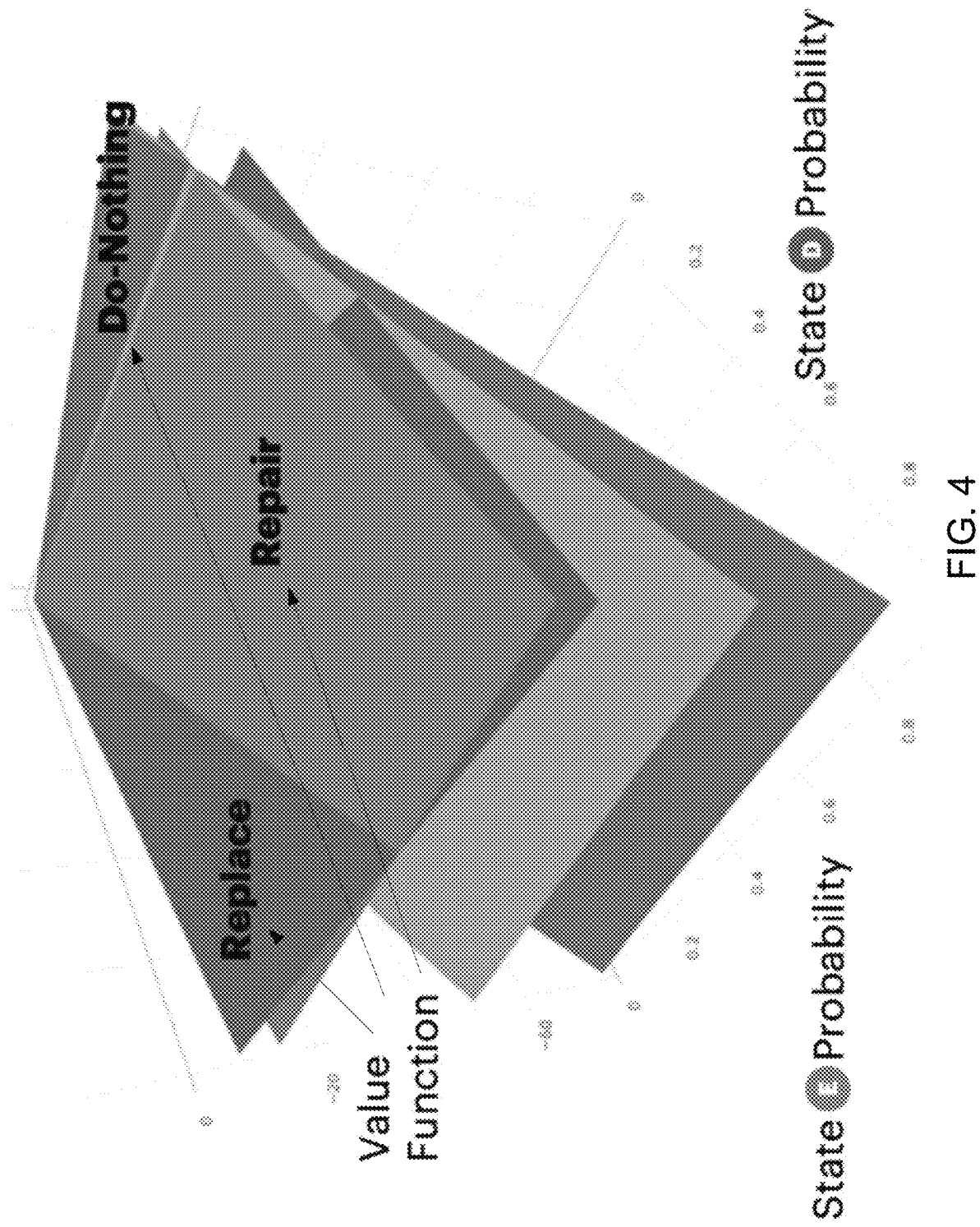
FIG. 4 is an example value function represented by a set of hyperplanes.

This policy may be derived from a value function which may generate a numerical value for each possible maintenance action that can be taken at each time step. In other words, a policy is a function that maps a vector of probability estimates of the current health state, where the vector may be a health state belief vector representing a degradation state of an asset. The degradation state of the asset may be based on one or more observations of probabilities of possible asset failures generated by the ML model 316. The vector may be mapped to an action that should be taken at that time step. There is no restriction on this value function and therefore it can be represented by a neural network, multi-dimensional hyper planes, or a decision tree. Thus, in an example, the local policy engine 132 may focus on a local policy that is derived from a value function represented by multi-dimensional hyper planes. A hyper plane can be represented with a vector of its coefficients; therefore, the value function can be represented by a set of hyperplanes as illustrated in the example of FIG. 4. In FIG. 4, a three-dimensional graph is illustrated with planes representing value functions with a first state D probability axis and a second state E probability axis.

To solve for this policy and compute the value function, the ML model engine 316 may model the degradation state of the factory equipment. In the example of the ML model 316 being a Hidden Markov Model. (HMM), parameters of the HMM model may be used by the observation states engine 318. In an example, a Partially Observable Markov Decision Process (POMDP) may be constructed in the observation states engine 318. The constructed POMDP, in the context of factory equipment modeling, may be defined by Equation 1:

$$POMDP = <S, A, T, R, X, O, \gamma, \pi> \qquad \text{(Equation 1)}$$

Where parameters in Equation 1 include a set of health states (S), a set of maintenance actions (A), an initial health state belief vector (\pi), a set of conditional transition probabilities between health state (T), a resource function (R), a set of observations (X), a set of conditional observation distributions (0), and a discount factor ($\gamma$). Since the model of degradation state in this example, the ML model 316, is a hidden Markov model, the states (S), the transition probabilities (T) and the initial probabilities ($\pi$) of the POMDP included in the observation states engine 318 may be are the same parameters as in the hidden Markov model parameters. Thus, the set of maintenance actions (A) may be defined as, for example, a0="Do Nothing", a1="Repair", and a2="Replace". This set of maintenance action may be configurable based on the maintenance policy of the specific factory equipment and how the equipment is operated. Similar to the maintenance actions (A), the resource function (R) may also be configured based on the specific factory equipment and how it is operated. The resource function (R) may include, for example, the financial cost of failure, the time and effort expenditure of replacement, the time and effort expenditure of repair, the negative financial cost of non-failure, and other resource outlay related parameters. In addition to financial cost and resource outlays, other forms of detriments, such as social cost of failure if the equipment failure could cause disruption to the environment for example or cause shortage of supply of certain commodity, or even the health and safety impacts on workers in the case of equipment failure may also be included.

Once the POMDP is defined as provided in Equation 1, the policy is then solved by the observations states engine 318 by generating the value function(s). In an example, the value functions may be generated using a value iteration algorithm by finding a sequence of intermediate value functions, each one being derived from the previous one. That is, the first iteration determines the value function for a time horizon of 1 time steps, then the value function for a time horizon of 2 time steps is computed from the horizon 1 value function, and so on and so forth. Once the value function is computed, the best action to take on each factory equipment at time t is then determined by finding the action with the highest value give the current state probabilities at time t.

The combiner circuitry 320 may combine the derived one or more policies (or value functions) for a particular time period with correspond health inference and predicted factory equipment states. Such health inferences and predicted factory equipment states may be determined by the health inference engine circuitry 130. The health inference engine 130 may use the sensor data on a feedback line 324 from the ML model 316 to generate the health inferences and predicted factory equipment states. As further described herein, the health inferences and predicted factory equipment states which are derived based on the degradation state transition matrix, the data emission distributions, and the initial state distribution, may be aligned or associated with value functions according to the time stamps of the equipment's operation. Accordingly, the combiner circuitry 320 performs selection of time based combination(s) of corresponding policies, health inferences and predicted equipment states to generate demand values 330. As also described herein, the demand values 330 represent degradation states of the particular piece of factory equipment compensated for predicted failure events. The demand values 330 are provided as inputs to the reinforcement learning engine 136.

In this regard, the received sensor data 306 may be processed through one or more machine learning models 316 that implement a so-called "health inference" to train the health inference engine circuitry 130 to learn the different degradation processes or states that assets such as factory equipment go through during their lifetime. Once the degradation processes or state is determined for an asset, the asset is considered to have a "character." The "character" generally corresponds to unknown/hidden sequence of states that cannot be observed directly within the sequential sensor data 306 gathered by the FDS 102.

Figure 5:
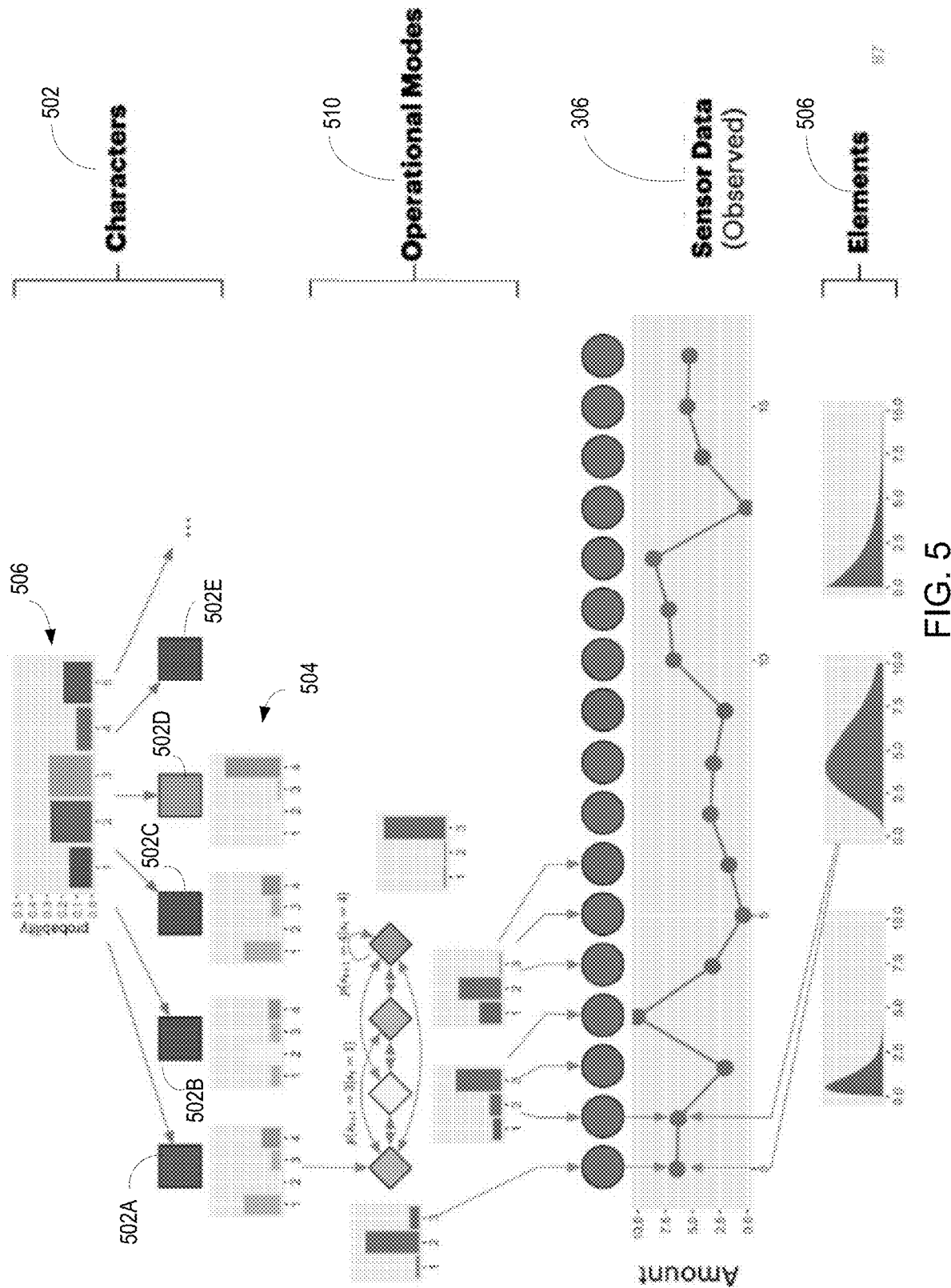
FIG. 5 illustrates an example implementation of a machine learning model in a failure detection system.

Referring to FIGS. 3 and 5, the character 502 of an asset represents a portrait of the asset being analyzed by the health inference engine 130 that fully describes its operation and uniquely identifies the specific piece of factory equipment. As illustrated in FIG. 5, the characters 502, or possible sequence of degradation states of a particular piece of factory equipment may each have an associated probability of occurrence. In the example of FIG. 5, each of the illustrated characters (502A, 502B, 502C, 502D, 502F, . . . ) include a graph 504 of four (1-4) observations of possible degradation states for the asset or piece of factory equipment, which are summarized as a degradation state probability for each of the characters 502 in the illustrated summary graph 506.

Each of the characters 502 corresponds to a mixture of operational modes 510 and how these operational modes 510 change over the life of the asset. The interpretation of the degradation state for each character 502 by the health inference engine circuitry 130 for each particular piece of factory equipment may change as more and more sensor data 306 from the piece of factory equipment is sampled. This characters 502 may be used at any point in time (e.g. time step) to predict the future operation of the asset and/or detect a change in the operation of the asset, which may be indicative of an anomaly. Selection of which of the characters 502 to use may be based on the respective degradation state probability.

The operational modes 510 associated with a respective character 502 are a set of distinct patterns learned from the observed sensor data 306. Each operational mode 510 may correspond to a mixture of common elements 512 (e.g., statistical distributions) from the observed sensor data 306. The character 502 may be defined in terms of how the asset traverses these different operational modes 504, as defined by a set of transition probabilities.

In general, the element 506 may be described as corresponding to a mixture of two or more distributions that are shared across different operational modes 504. Every operational mode 504 may share the same elements 506. The number of elements 506 being shared between the operational modes 504 may be different for different operational modes 504. The mixture of distributions may be learned from sensor data 306.

Figure 6:
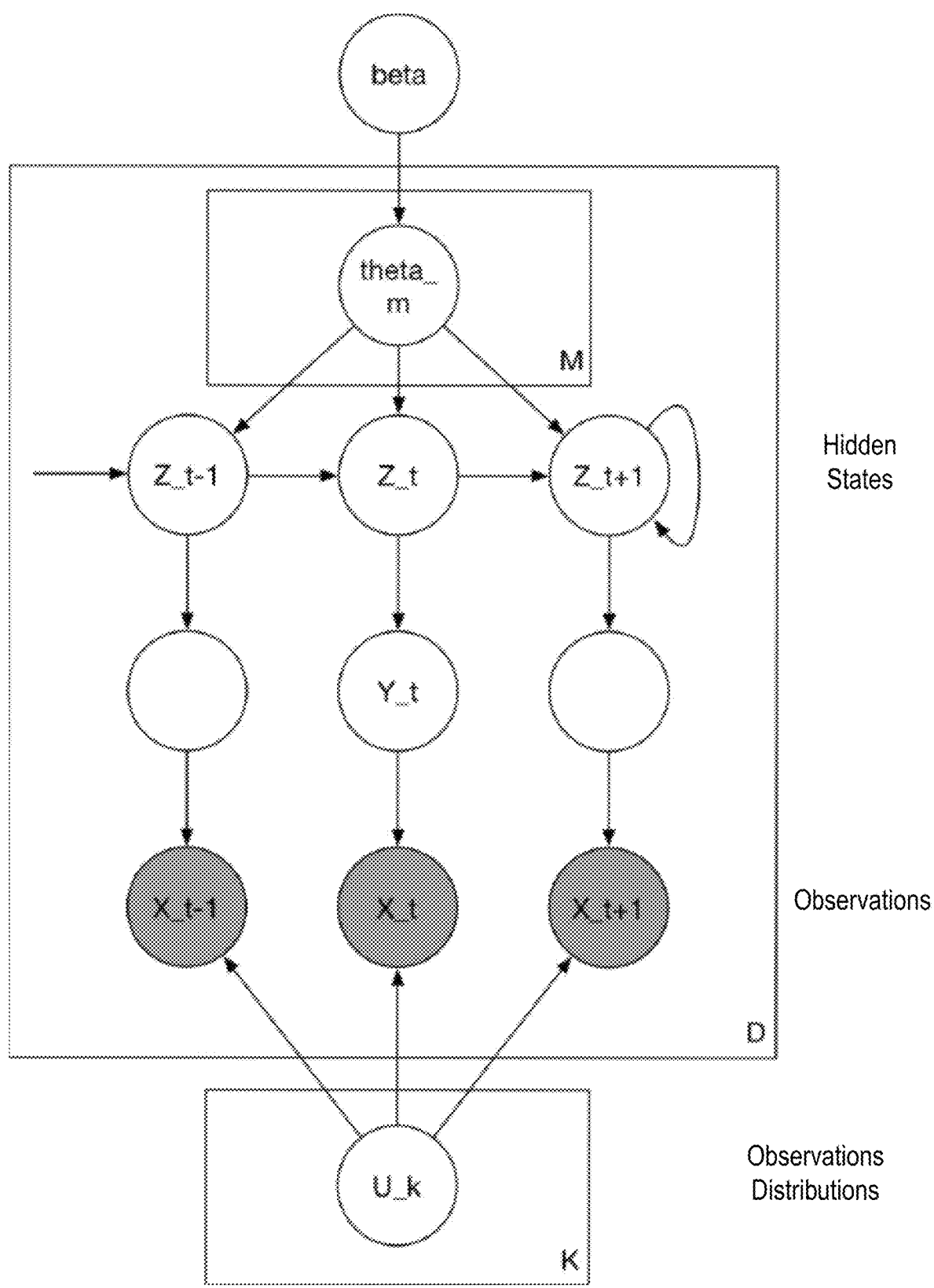
FIG. 6 is a graphical model representation of a mixed membership model.

Referring to FIGS. 3 and 6, the core of the health inference engine 130 may, for example, include a Mixed Membership Model (MMM) which captures the hierarchical structure present in the sample data 306, and a Hidden Markov Model (HMM) that captures the sequential dependences between data points within the sequence of sample data 306. The Hidden Markov Model may capture different operational modes represented by hidden states 602 of a specific piece of factory equipment. The character of the specific piece of factory equipment being analyzed may then be created using a combination of the operational modes, which describe the different operations the specific piece of factory equipment can exhibit, as well as how these operational modes change over time, which is captured by the degradation state transition matrix of the Hidden Markov Model. The health inference circuitry 130 has the ability to predict with some probability the next possible observation 317 given the what has been observed in the past.

Since there is a timestamp associated with every data sample collected by the sensors, the sequential/time dependency between observations 317, or measurements, may be captured by, for example, the combination of the MMM model and the HMM model. These two models, once combined give rise to a powerful statistical tool that captures the hierarchical changes and sequential dependencies present in the sensor data as observations of probabilities of possible failures 317 resulting in a degradation process for a particular piece of factory equipment. It is understood that other models may be utilized in lieu of or in combination with the HMM and/or MMM such as, for example, Latent Dirichlet Allocation, Kalman Filter, and Particle Filter.

There is no restriction on the sample data structure representing an observation 317 or data point. That is, an observation could be a continuous value, a discrete value, a combination of the two, or even a sequence in itself. The underlying ML model 316 is generative in nature and may be trained using Monte Carlo sampling techniques, which captures the uncertainty in the learned parameters (the full posterior distribution), and that uncertainty may then be leveraged by the system, along with a problem specific loss function to make decisions that minimize the expected loss given a certain level of risk.

The ML model 316 may be trained using maximum likelihood techniques, which may be more scalable than Monte Carlo sampling methods, or may be trained using variational Bayes techniques, which typically restrict the volume of the data, but may still be more scalable than variational Bayes. Once the ML model 316 is trained, the inference may be done in real-time to generate observations 317 for degradation states. Furthermore, the implemented ML model 316 may be updated continuously, without having to retrain the model on historical data in batches.

The FDS 102 may also be configured to handle sequences of data samples 306 of varying lengths and varying sampling frequencies from different entities. This is useful in cases where some factory equipment generates very little data compared to other factory equipment that generate vast amounts of data. The implemented ML model 316 may exhibit information pooling, a technique that allows different groups within a population to share statistical information. Therefore, entities with very little data will pool more information from other entities, whereas entities with vast amount of data will pool less information and will rely more on its own data.

Figure 7:
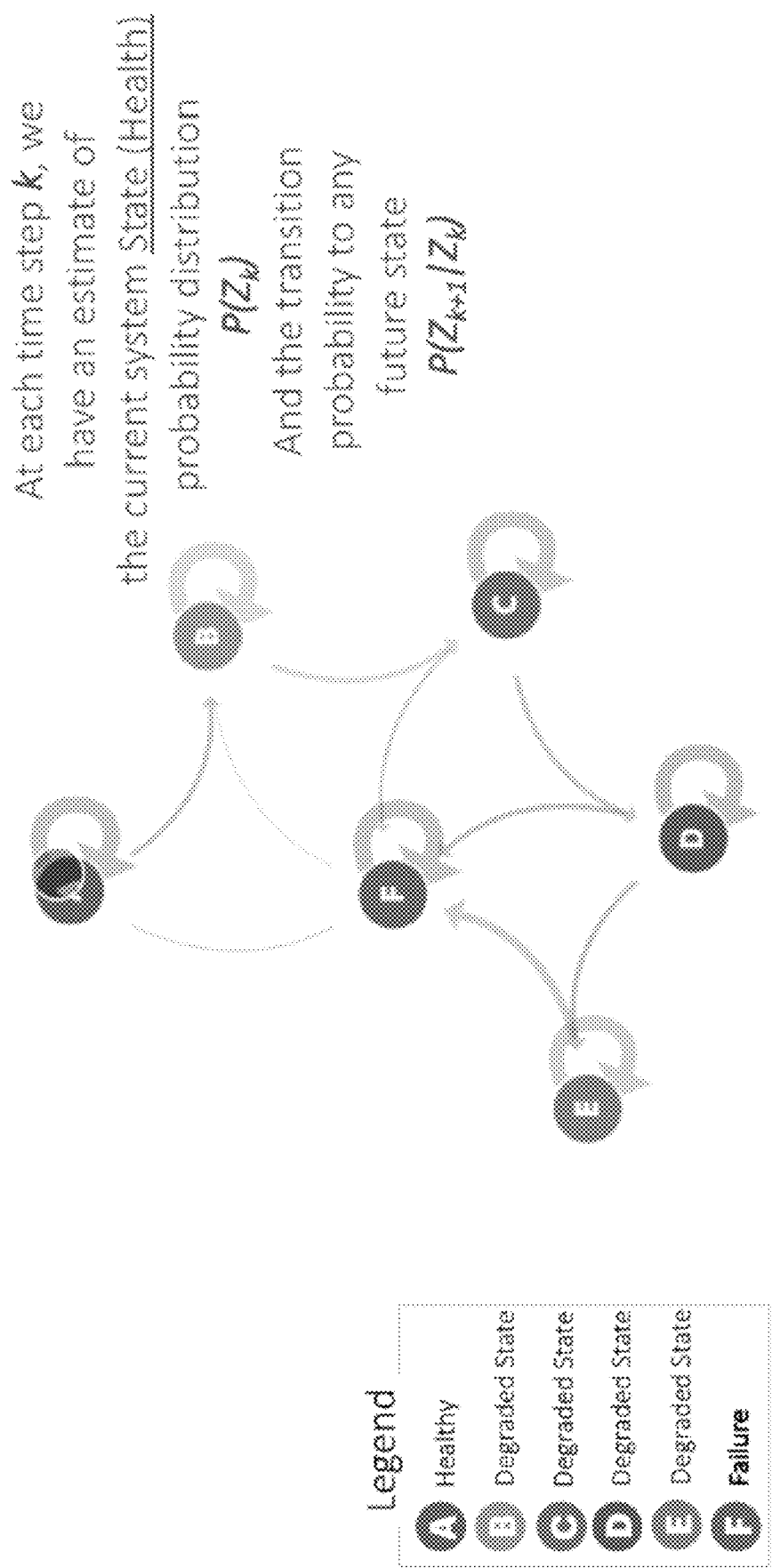
FIG. 7 is an example of a hidden markov model as a stochastic model of degradation process.

Referring to FIG. 7, as noted above, the ML model 316 represents the sample data as observations 317, which are a mixture of different stochastic degradations processes. Each degradation process, or state, which may be a hidden Markov model, may be defined by an initial state probability distribution, a degradation state transition matrix, and a data emission distribution.

In an example, each of the hidden Markov models may have a terminal state that represents the failure state of the asset (illustrated as "F" in FIG. 7). Other states (illustrated as "A", "B", "C", "D", "E" in FIG. 7) represent "health" states of the asset as it progresses towards failure. The probability distribution of these non-terminal states (illustrated as "A", "B", "C", "D", "E" in FIG. 7) are learned from the sample data as well as the transition probabilities between states.

Figure 8:
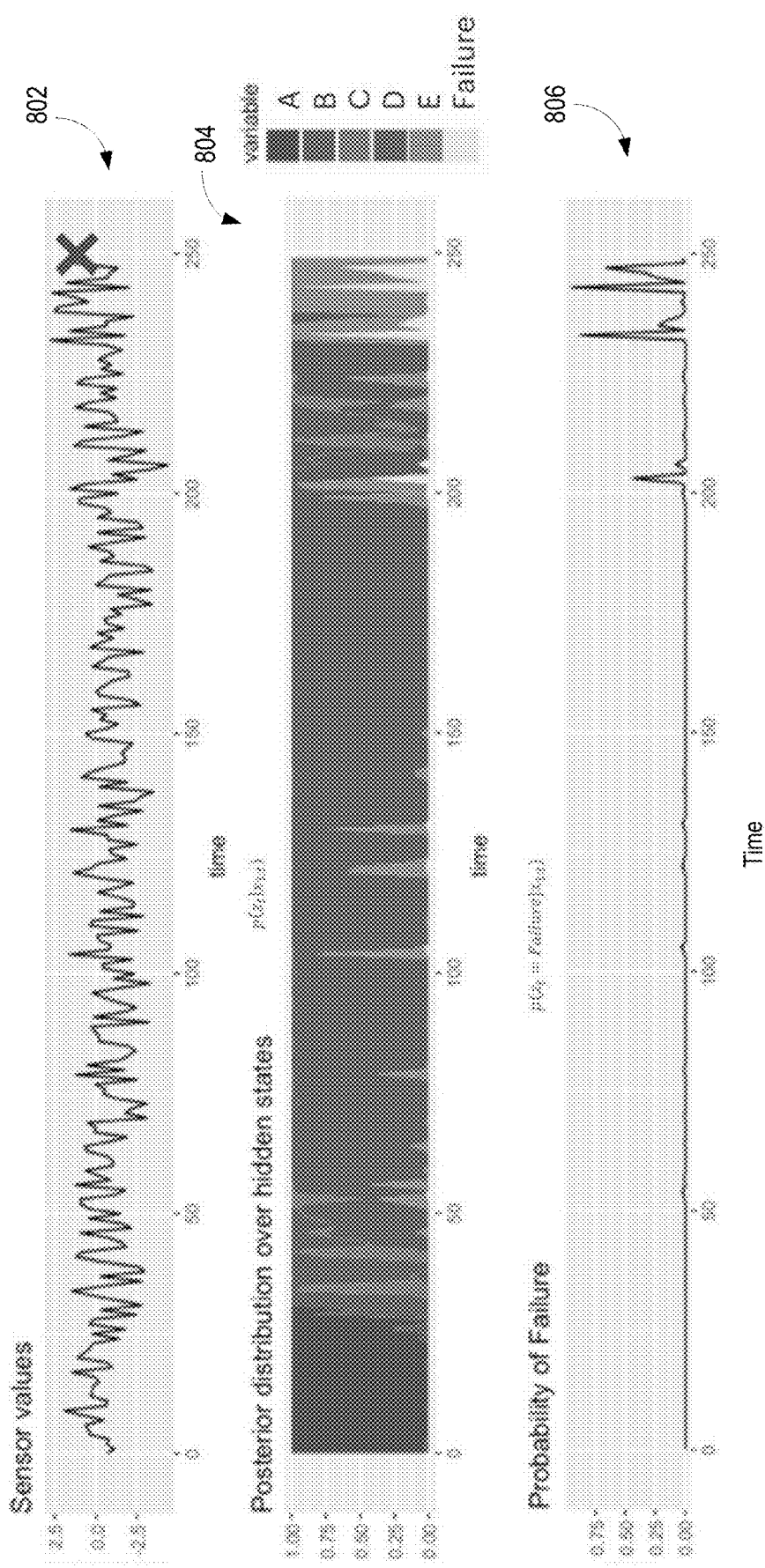
FIG. 8 is an example dataset generated by sampling a model.

FIG. 8 is an example dataset generated by sampling with the ML model 316 (FIG. 3). As illustrated in FIG. 8, data samples in the form of sensor values 802 over a range of time may result in an output from the ML model 316 of a posterior predictive distribution 804 of observation states 317 (illustrated as "A", "B", "C", "D", "E" in FIG. 8) and a failure state ("Failure"). The posterior predictive distribution 804 of observation states 317 may be illustrated by a probability of failure graph 806 as being predicted to be more likely to occur as time approaches 250. As described later, prediction of a failure actually occurs at time 250, as illustrated by "X" in the sensor values 802 may be predicted with the root cause analysis circuitry 134.

Forward probability calculations may be used to facilitate online incorporation of historical information for failure time distribution prediction. Note that in this example, the data rate and the Markov chain evolution may be decoupled which may allow for some observations 317, or data points, to be missing.

As further discussed herein, in some cases domain knowledge about the degradation process, or state, may be utilized. The domain knowledge may be provided by the root cause analysis circuitry 134 in the form of end of life failure predictions. Therefore, expert knowledge of the failure mechanism may be incorporated in the ML model 316 by enforcing constraints on the structure of the degradation process or states, such as the structure of the degradation state transition matrix of a Hidden Markov Model. For example, not allowing the asset to transition from an "unhealthy" state to a "healthy" state can be incorporated by enforcing a constraint in the form of a zero probability in the entries of the structure, such as the structure of the degradation state transition matrix, that represents the probability to transition from an "unhealthy" state to a "healthy" state. Enforcing constraints on the structure, such as the structure of the degradation state transition matrix, may also reduce the computational complexity during model training as well as when the health inference circuitry 130 is running in production for online prediction and inference of observations.

Important properties of data generated from a fleet of mechanical assets, such as factory equipment, may include right censoring sample data to create a threshold of observation states 317. In the context of failure data, right censoring indicates that the failure times are only partially known because for the vast majority of the assets, the actual failure time is unknown, only information up to the last time the asset was alive (e.g. not in a terminal or failure state) is known. Right censored observations may be handled in the ML model 316 by conditioning the ML model 316 on the possible states the particular piece of factory equipment can be in at each point in time. For example, the ML model 316 may be conditioned using end of life predictions to provide all non-terminal (non-end of life) observation probability states of the asset, if the asset is right censored at time t.

Once the model parameters are estimated, the ML model 316 may be used for different inferential tasks. As new sample data streams arrive from a piece of factory equipment, the initial health state belief vector may be calculated online or recursively based on the observations to provide an estimate of the most probable "health" state the piece of factory equipment is in. This is a filtering operation which may apply, for example, Bayes rule in a sequential fashion.

Another important inference task is failure time prediction. As new sample data is streamed in, an estimate of the asset "health" state over a certain future horizon is calculated with the health inference circuitry 130 as well as the most probable time at which the piece of factory equipment will enter the "failure" state (terminal state) as calculated by the root cause analysis circuitry 134. Both of those inferential tasks are important as they provide a picture of the current state (degradation state) of the entire fleet of factory equipment, as well as a forecast of when each asset will most likely fail. This information may then be utilized to optimize the decision-making process to maintain and replace these assets.

Referring back to FIGS. 2 and 3, at operation 210, the root cause analysis circuitry 134 may include a root cause model in the AI subsystem 115 trained to infer the root cause of failure in a piece of factory equipment. This is further illustrated in section 315 of FIG. 3 by the root cause analysis circuitry 134.

The root-cause of the failure events may be inferred in terms of covariates effects. Covariates 334 are predictor values, which may be output by the root cause analysis circuitry 134. Covariates 334 are variables that are predictive of possible failure times for a specific piece of factory equipment. Generation and use of the covariates 334 may be accomplished via the so-called "Two-Stage" and "Joint" methods.

In the "Two-Stage" method the learned generative model (ML model 316) that describes the stochastic degradation process is sampled by simulation circuitry 336 and labeled by simulated labeled data circuitry 338. The fully labeled sample data may then be fitted to a root cause model 340, which may be part of the root-cause analysis circuitry 134, and included in the AI subsystem 115 (FIG. 1). In examples, the root cause model 340 may be an accelerated failure time model (AFT) or a Cox proportional hazard (CPH) model. The root cause model 340 may generate the covariates for receipt as feedback inputs by the ML model 316 as represented in FIG. 3 by a covariates value line 332. Based on the covariates, the ML model 316 may generate predicted degradation states compensated with predicted failure events using the covariates.

In an example application of the "Joint" method, the overall likelihood of both the sequential/longitudinal data and the failure times may be modeled jointly by the root cause model 340. The parameters of the root cause model 340 along with their uncertainty estimates may indicate the effects of each covariate 334 on the expected failure time. Accordingly, the root cause model 340 may not only generate the covariates, but also initiate the functionality of the ML model 316 to generate predicted degradation states compensated with predicted failure events. Thus, the root cause model 340 may operate as the ML model 316 for re-generation of the predicted degradation states as compensated degradation states according to the covariant. Accordingly, in the "Joint" method the ML model 316 included in the AI subsystem 115 (FIG. 1) may be jointly used by both the health inference engine 130 to generate the degradations states and the root cause analysis engine 134 to re-generate the degradations states as compensated degradation states. This "Joint" method is illustrated in FIG. 3 by the overlap of section 310 and section 315 with respect to the ML model 316.

Figure 9:
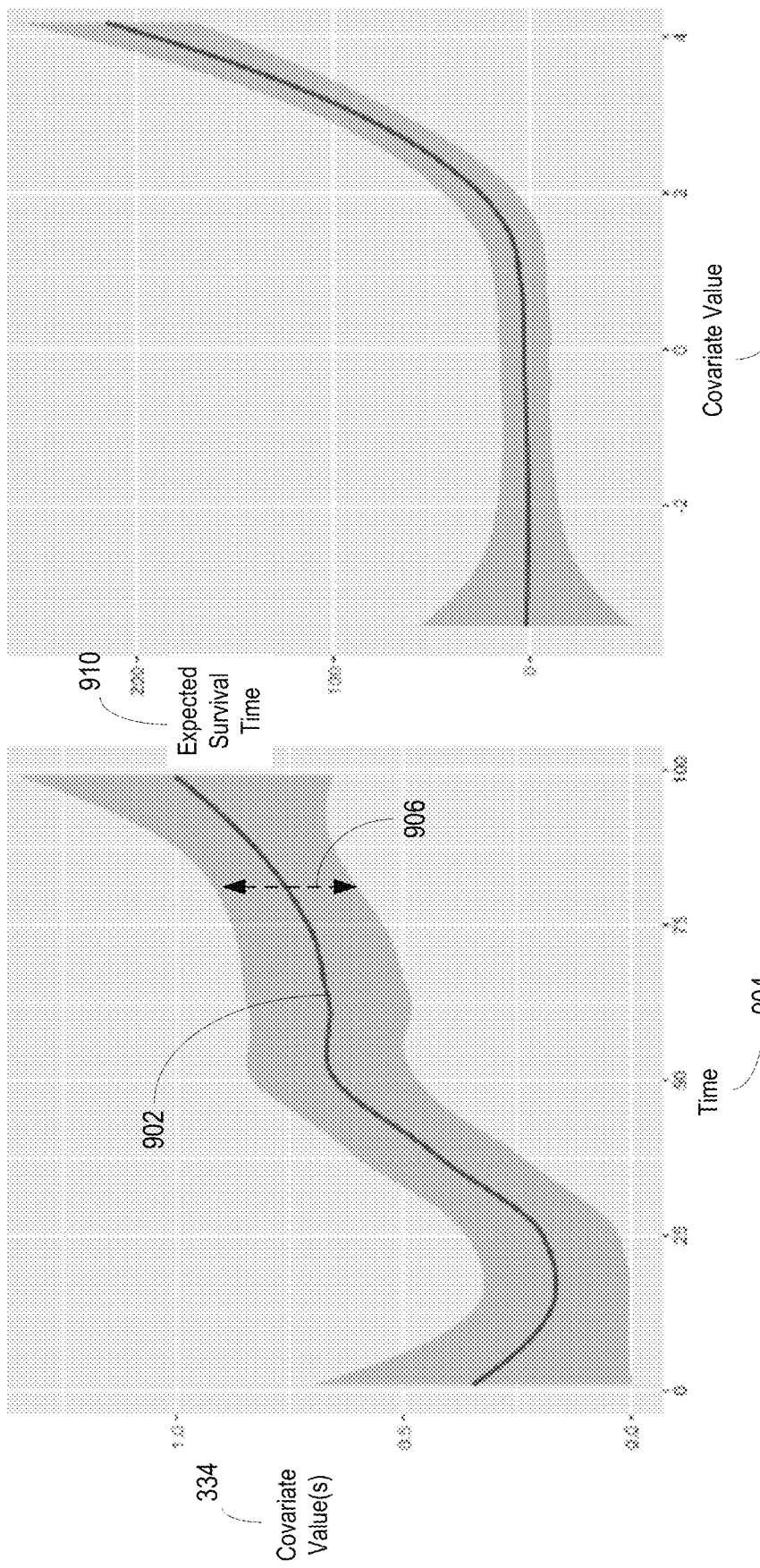
FIG. 9 illustrates example graphs of the effect of a covariate/predictor on expected failure time.

FIG. 9 illustrates example graphs of the effect of a covariate/predictor 334 on expected survival time of a specific piece of factory equipment. In FIG. 9A, a probability of survival indicator 902 at a given time 904 may vary about a range of variation 906 according to predicted probability of failure provided by one or more generated covariate values 334. FIG. 9B illustrates the effect on expected survival time 910 of a specific piece of factory equipment(s) in view of changes in the value of the covariate(s) 334. In other examples, other parameter values may be used to illustrate the effect of the covariate(s) 334 on survival time.

Referring again to FIG. 3, and focusing on the "Two Stage" method, the fitted root cause model 340 described above may be a fully generative model of a joint probability distribution. This generative model may be the ML model 316 and may be used to generate random sequences of observations that mimic the stochastic failure degradation process of the health inference circuitry 130. Alternatively, the covariates 334 may be provided to the ML model 316 over the covariate value line 332 such that the ML model 316 can generate observations in view of the covariants 334. Due to the covariates 334 determined by the root cause model 340, the observations generated by the ML model 316 may terminate in a simulated failure event. In an example, suppose dataset $D=[D_1, D_2, \ldots, D_N]$ are the observation states generated by the ML model 316, where $n \in 1, \ldots, N$ is generated by sampling the ML model 316, such as a generative MMM-HMM model described above. In this example, Let $D_n = [X_{n1}, X_{n2}, \ldots, X_{nTn}]$ where $tn \in 1, \ldots, T_n$ is the nth generated sequence of observations of length $T_n$. The subset data $X_n T_n \forall_n \in N$ may then be used to fit the root cause model 340, such as an accelerated failure time model (AFT) or a Cox proportional hazard (CPH) model. The covariant(s) determined by the root cause model 340 may then be used to by the ML model 316 in the health inference engine 130 ("Two-Stage") or in the root cause analysis engine 134 ("Joint") to model a sequence of continuous or discrete observations generated by the ML model 316 that account for the covariants 334.

In these examples, since the data D is generated by the ML model 316 using covariants provided by the root cause model 340, observation states will be complete and no longer right-censored unlike the original dataset supplied from the ML model 316 in the health inference engine 130. Since the failure time of each generated sequence will be known, the predicted degradation states may be compensated with predicted failure events. Distributions such as Weibull, Log-gaussian, or Log-logistic distributions may be used to describe the failure time distribution while accounting for censoring. Based on the complexity of the degradation process in the "Joint", an extended Cox proportional hazard model may be used instead of AFT for the root cause model 340.

In some examples, the root cause model 340 may be a Cox proportional hazard model used for analyzing continuous time-to-event data. In these examples, however, the Cox model with linear predictor may be extended to a more general form to enable additive and non-linear effects of covariates 334 by replacing the linear predictor with a latent predictor depending on the covariate value 334. This latent predictor $\eta_n$ may be assumed to have a Gaussian Process (GP) prior which allows for smooth nonlinear effects of continuous covariates 334 to be captured, and if there are dependences between covariates 334, the GP can model these interactions implicitly.

In examples, the extended proportional hazard model may be expressed as:

$$h_n(t) = \exp(\log(h_0(t)) + \eta_n(X_n)), \quad \text{(Equation 2)}$$

where the latent predictor $\eta_n$ depends on the covariates $X_n$ 334.

In examples of the ML model 316 being an AFT model fit to the data $X_n, T_n$ described above, a set of parameters β may be produced that describe the effect of each covariate value 334 on the expected failure time. Assuming a log-logistic survival distribution, the log likelihood for the log-logistic model may be expressed as:

$$p(y\mid -) = \prod_{n=1}^{N}\left(\frac{ry^{r-1}}{\exp(f(X_n))}\right)^{1-z_n}\left(1+\left(\frac{y}{\exp(f(X_n))}\right)^r\right)^{z_n-2} \quad \text{(Equation 3)}$$

where r is the shape parameter and $z_n$ is the censoring indicator.

The covariates (sensor values) 334 may be incorporated in this failure model through a linear model. To capture non-linear effects of covariates 334 on the expected failure time, a Gaussian process may be centered on a linear model to get a latent model:

$$f_n(X_n) = \alpha + X_n\beta = \mu(X_n), \quad \text{(Equation 4)}$$

where β describes the effect of covariant sensor value X on the failure time using data from only time slice t, and μ is drawn from a GP(0,k) with some k covariance function (squared exponential for example).

In order for the root cause model 340 to compute how different values of the covariates 334 affect the expected failure time using, for example, a fitted AFT model, a conditional comparison may be performed on each covariate 334 with all others fixed to their mean values or defined values. This comparison will identify how each covariate 334 affects the expected failure time of the asset as illustrated in FIG. 9.

Referring back to FIGS. 2 and 3, at operation 215, the reinforcement learning engine 136 may be implemented to facilitate generation of a maintenance schedule for maintaining assets. This is further illustrated in section 320 of FIG. 3.

In this regard, the ML model 316 may be used to simulate and predict the specific failure states of each respective piece of factory equipment using observations 317 over some finite time horizon and covariates from the root cause model 340. The predicted asset degradation state and the uncertainty around it is then fed into the reinforcement learning engine as the demand 330. An objective function 356 may also be provided to the reinforcement learning engine 136 from, for example, the simulation circuitry 336. The objective function 356 may include factory equipment specific objective function information and/or factory equipment fleet objective function information such as, for example, throughput, yield, profits, rewards, utility, and/or other ascertainable parameters, or minimizing cost. In addition, the reinforcement learning engine 136 may receive deterministic state variables 350 and exogenous variables 352 that may describe the state of the environment where the particular piece of factory equipment operates. The deterministic state variables 350 may include, for example, information related to the number of assets in inventory, product demand, work orders, number of crews working on that day, the skills of each crew, the criticality of each asset, crew location, and other etc. The exogenous information variables 352 may include, for example, variables such as weather conditions, traffic conditions, and forecasted product demand.

For example, assume the asset fleet consists of a state space S, and at each time step t, the system is in a particular state $S_t \in S$ from which some action should be taken from a set of actions A. For example, the state vector $S_t$ may represent the individualized "health" state of each asset in the asset fleet inferred from the observations 317 provided by the health inference circuitry 130. $S_t$ may also include deterministic state variables 350 and/or exogenous variables 352. Further, one or more objective functions 356 may be provided to the reinforcement learning engine 136.

Example of decisions to be made at time t can be "which crew is assigned to which asset, which product to produce at which time using which factory line, and what is needed to maintain it". This decision $a_t$ results in rewards or costs, typically given by $C_t(S_t, a_t)$, and sequentially provides a new state $S_t+1$ with some probability $P(S_{t+1}|S_t, a_t)$. Any number sequentially determined new states may be determined in this way. Thus, the decisions not only determine the costs/rewards but also the state of the environment where future decisions will take place, thus impacting future costs/rewards. The goal of the system is to identify an optimal policy for maintenance and operations that maximizes a defined objective function (i.e., utility, profits, throughput . . . etc.) 356.

A policy $\pi \in \Pi$ may be a decision function that returns a decision $a_t$ for any degradation state $S_t$. The reinforcement learning engine 136 may determine the optimal policy which minimizes an objective function as approximation to the total discounted future costs:

$$\min_{\pi}\mathbb{E}\left[\sum_{t=1}^{T}\gamma C_t(S_t, a_t^{\pi}(S_t))\right] \quad \text{(Equation 5)}$$

where γ is a discount factor, and T denotes the planning horizon, which could be infinite. This optimal policy may then generate an output, such as a report(s), instructions, and/or a directive(s) to another system or machine to generate the best action to take at each time step that will minimize the sum of future cost. These actions determine a maintenance schedule that can generated on a display or as hardcopy and provided to the appropriate crew members to follow.

In addition, or alternatively, the system may communicate with the specific piece of factory equipment. Such communications may include instructions executable by the piece of factory equipment. The instructions may modify the operation of the piece of factory equipment. For example, the piece of factory equipment may execute the instructions to initiate new alarming or operational thresholds, such as temperatures or pressures in an effort to prolong time to failure. In other examples, the instructions may be executed to change levels of consumables, such as lubricants, fuel, coolant and the like in the piece of factory equipment, if, for example, the system determines that the cost of additional consumable is warranted to prolong operation before a failure state occurs. In still other examples, instructions may be executed to implement new or different operating steps or processes that were determined by the system as prolonging time to a failure state, such as increasing or decreasing certain operational activities, providing additional instructions to an operator of the machine or eliminating some functionality of the machine. Such automated and machine specific communications by the system may align with the objective functions by adjusting the character of a particular piece of factory equipment.

Figure 10:
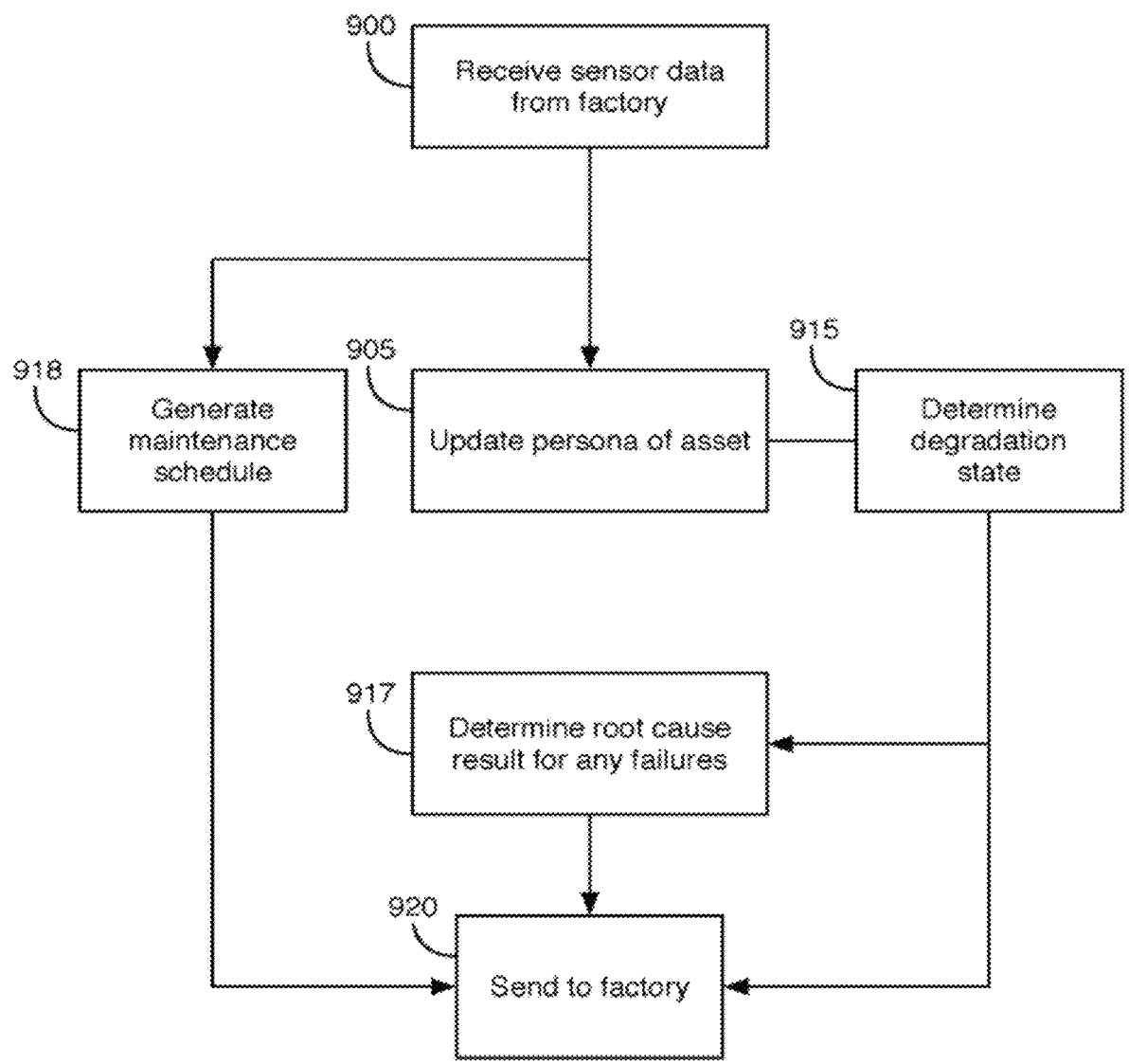
FIG. 10 illustrates various exemplary operations performed by a failure detection system.

FIG. 10 illustrates various example operations performed by the processor circuitry 125, AI subsystem 115, and/or other functionality of the FDS 102 for providing real-time maintenance and/or reporting of the state of assets in a factory. The operations of FIG. 10 may be implemented after the operations of FIG. 2 or may be implemented simultaneously. In this regard, the operations may be implemented via instruction code stored in non-transitory computer readable media 127 that resides within the subsystems configured to cause the respective subsystems to perform the operations illustrated in the figures and discussed herein.

With reference to FIGS. 3 and 10, at operation 900, sensor data 306 may be received from assets operating in a factory. The sensor data may be received in real-time or near real-time (e.g., at the end of the day, week, every hour, etc.).

At operations 905 and 915, the sensor data 306 is processed by the health inference circuitry 130 to determine the current degradation state associated with each asset for which sensor data is received using observations. For example, the degradation state may correspond to one of the states illustrated in FIG. 7. The sensor data 306 may be also be processed by the health inference circuitry 130 to update the "character" of a given asset in order to facilitate adjusting the "character" over time. For example, the character may be adjusted to accommodate for changes, unrelated to the degradation of an asset, that may occur over time. The state of degradation of the asset may be communicated to the factory at operation 920.

At operation 917, the output of the degradation state by the health inference circuitry 130 may trigger the root cause analysis circuitry 134 to infer the root cause of a failure. For example, if the degradation state indicates that the asset is about to fail or has failed, the root cause analysis circuitry 134 may attempt to infer the cause of the failure as described earlier. The inferred root cause of a failure may be communicated to the factory at operation 920.

At operation 918, the reinforcement learning engine 136 may generate an individualized maintenance schedule for maintaining the particular piece of equipment according to the individualized degradation state. For example, the schedule may specify the day on which maintenance work should be performed on an asset. The schedule may indicate the specification of technicians for performing the work. Other information may be included in the schedule. Alternatively, or in addition, the reinforcement learning engine 136 may communicate instructions to the particular piece of equipment. The maintenance schedule and/or the communication may be communicated to the factory at operation 920.

There are many use cases for the methodology and system described above. For example, failure prediction of asset fleet may be input to reinforcement learning to optimize the schedule and/or route of the maintenance crew. Another example for combining failure prediction and reinforcement learning is discrete manufacturing under sterile conditions, for example bottling of liquids with limited shelf life. Sterilizing a filling plant takes many hours (typically >10 hours). In general, unplanned down time due to loss, or break of sterility reduces throughput. The system described herein may provide improved prediction of failure events due to mechanical or electrical failures as input for the reinforcement learning engine 136 to increase overall throughput as well as propose optimal action given certain constraints, type of failure and the production schedule and resources. The reinforcement learning engine 136 may contain the constraints of manufacturing. For example, given a certain failure event like a gripper failing, what is the maximum speed for bottling one can run without losing sterility. Or, which mechanical events lead to loss of sterility, i.e., there is no allowed way of mitigation but to sterilize the whole unit. Besides prescribing action to mitigate a predicted failure event by changing or replacing parts the reinforcement learning engine 136 may also be used to find the optimal time for re-sterilization, i.e., based on the failure prediction as input, the reinforcement learning engine 136 may prescribe the optimal point in future time, when to re-sterilize taking the constraints from the production schedule into account. Typically, the production schedule contains cycles of batches of similar products when the sequence is important. For example, when producing colors, or bottling drinks like juice or chocolate, the first cycle may be started with white and then light colors, moving on to the darker colors and finishing with black (chocolate). Unplanned outages caused by random mechanical or electrical failures lead to a shortening of the production schedule, e.g. the dark colors will not be produced anymore because the plant has to be taken apart. In such a case the reinforcement learning engine 136 may reschedule taking inventory levels, sales forecast and the production capacity of previous and successor steps, plus all other constraints into account.

Figure 11:
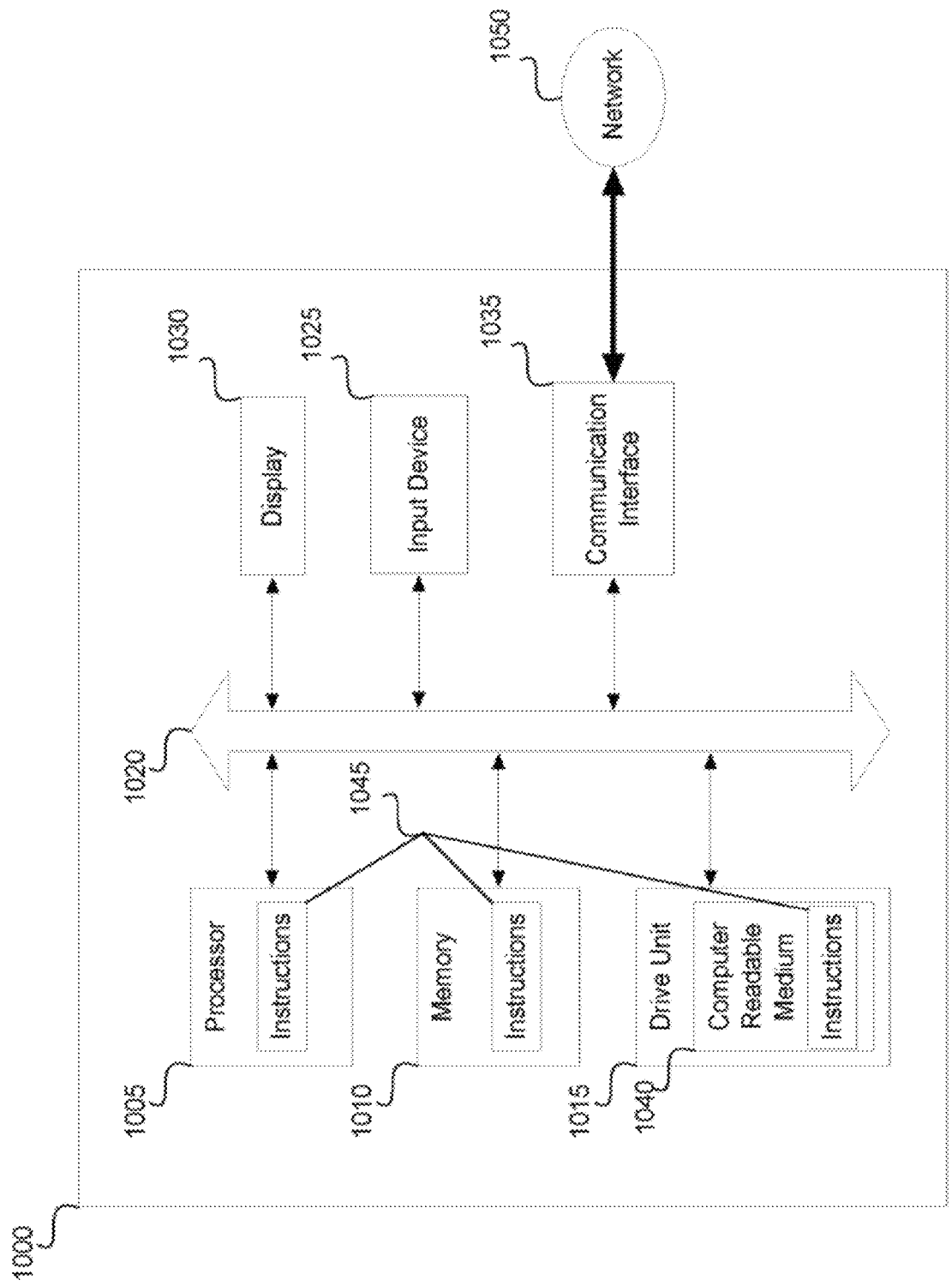
FIG. 11 illustrates a computing system that may form part of or implement at least part of a failure detection system.

FIG. 11 illustrates a computer system 1000 that may form part of or implement the systems, environments, devices, etc., described above. The computer system 1000 may include a set of instructions 1045 that the processor 1005 may execute to cause the computer system 1000 to perform any of the operations described above. The computer system 1000 may operate as a stand-alone device or may be multiple cooperative operating devices and/or may be connected, e.g., using a network, to other computer systems or peripheral devices.

In a networked deployment, the computer system 1000 may operate in the capacity of a server or as a client computer in a server-client network environment, or as a peer computer system in a peer-to-peer (or distributed) environment. The computer system 1000 may also be implemented as or incorporated into various devices, such as a personal computer or a mobile device, capable of executing instructions 1045 (sequential or otherwise) causing a device to perform one or more actions. Further, each of the systems described may include a collection of subsystems that individually or jointly execute a set, or multiple sets, of instructions to perform one or more computer operations.

The computer system 1000 may include one or more memory devices 1010 communicatively coupled to a bus 1020 for communicating information. In addition, code operable to cause the computer system to perform operations described above may be stored in the memory 1010. The memory 1010 may be a random-access memory, read-only memory, programmable memory, hard disk drive or any other type of memory or storage device.

The computer system 1000 may include a display 1030, such as a liquid crystal display (LCD), a cathode ray tube (CRT), or any other display suitable for conveying information. The display 1030 may act as an interface for the user to see processing results produced by processor 1005.

Additionally, the computer system 1000 may include an input device 1025, such as a keyboard or mouse or touchscreen, configured to allow a user to interact with components of system 1000.

The computer system 1000 may also include a disk or optical drive unit 1015. The drive unit 1015 may include a computer-readable medium 1040 in which the instructions 1045 may be stored. The instructions 1045 may reside completely, or at least partially, within the memory 1010 and/or within the processor 1005 during execution by the computer system 1000. The memory 1010 and the processor 1005 also may include computer-readable media as discussed above.

The computer system 1000 may include a communication interface 1035 to support communications via a network 1050. The network 1050 may include wired networks, wireless networks, or combinations thereof. The communication interface 1035 may enable communications via any number of communication standards, such as 802.11, 802.12, 802.20, WiMAX, cellular telephone standards, or other communication standards.

Accordingly, methods and systems described herein may be realized in hardware, software, or a combination of hardware and software. The methods and systems may be realized in a centralized fashion in at least one computer system or in a distributed fashion where different elements are spread across interconnected computer systems. Any kind of computer system or other apparatus adapted for carrying out the methods described herein may be employed.

The methods and systems described herein may also be embedded in a computer program product, which includes all the features enabling the implementation of the operations described herein and which, when loaded in a computer system, is able to carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While methods and systems have been described with reference to certain embodiments, it will be understood by those skilled in the art that various changes may be made and equivalents may be substituted without departing from the scope of the claims. Therefore, it is intended that the present methods and systems not be limited to the particular embodiment disclosed, but that the disclosed methods and systems include all embodiments falling within the scope of the appended claims.

The invention claimed is:

1. A system for predicting equipment failure events and optimizing manufacturing operations, the system comprising:
   an interface for receiving sensor data respectively associated with one or more assets;
   a processor in communication with the interface; and
   non-transitory computer readable media in communication with the processor that stores instruction code, which when executed by the processor, causes the processor to:
   input the sensor data into a first model trained to generate a stochastic degradation model for classification of a current degradation state of a particular asset;
   input the current degradation state of the particular asset into a second model trained to infer a root cause for a failure of the asset based on the stochastic degradation model, wherein the second model provides a prediction of a future root cause for failure of the particular asset in a form of a covariant, and the first model provides a compensated predicted degradation state based on the covariant;
   input the sensor data into a reinforcement learning engine configured to generate a maintenance schedule based at least in part on the stochastic degradation model of the particular asset; and
   communicate the maintenance schedule to an entity associated with the particular asset or the particular asset.

2. The system according to claim 1, wherein the first model is a hidden Markov model combined with a mixed membership model and is trained using sensor data associated with a plurality of different assets.

3. The system according to claim 1, wherein the reinforcement learning engine is configured to generate the maintenance schedule also based at least in part on parameters associated with the particular asset define one or more of:
   inventory, product demand, work orders, number of crews working on that day, skills of each crew, criticality of each asset, crew location, weather conditions, traffic conditions, and forecasted product demand, and the reinforcement learning engine is configured to find a maintenance policy among a plurality of policies corresponding to one of a plurality of predicted degradation states, the maintenance schedule generated therefrom.

4. The system according to claim 1, wherein the stochastic degradation model specifies a degradation state transition matrix, a data emission distribution, and initial state distribution.

5. The system according to claim 1, wherein the current degradation state is specific to the particular asset and is a predicted degradation state compensated with a predicted failure event for the particular asset.

6. The system according to claim 1, wherein the particular asset is a piece of factory equipment and the current degradation state is ascertained by the first model based on the sensor data provided from the piece of factory equipment, the current degradation state being specific to the piece of factory equipment.

7. The system according to claim 1, wherein the first model trained to generate the stochastic degradation model for classification of the current degradation state of the particular asset is trained with sensor data associated with a plurality of different pieces of factory equipment by capture of sequential dependencies between data points within a sequence of the sensor data with a hidden Markov model and capture of a hierarchical structure present in the sensor data with a mixed membership model.

8. A method comprising:
   receiving a plurality of sensor data from a plurality of sensing parameters of a piece of factory equipment;
   generating predicted degradation states of the piece of factory equipment, with a first model trained to generate a stochastic degradation model for classification of the predicted degradation states of a particular asset;
   fitting the predicted degradation states to a second model trained to generate a covariate indicative of a failure condition of the piece of factory equipment;
   supplying the covariate to the first model to generate predicted degradation states compensated with the covariate;
   generating a policy of a maintenance action based on the predicted degradation states to optimize life expectancy of the piece of factory equipment;
   generating a maintenance/operation schedule based on the policy; and adjusting operation of the piece of factory equipment based on the maintenance/operation schedule.

9. The method of claim 8, wherein supplying the covariate to the first model to generate the predicted degradation states compensated with the covariate comprises supplying the covariant as a feedback to the first model for re-generation of the predicted degradation states as compensated degradation states according to the covariant.

10. The method of claim 8, wherein supplying the covariate to the first model to generate the predicted degradation states compensated with the covariate comprises operating the second model as the first model for re-generation of the predicted degradation states as compensated degradation states according to the covariant.

11. The method of claim 8, wherein generating predicted degradation states of the piece of factory equipment further comprises combining a hidden Markov model with a mixed membership model and training the combined hidden Markov model and the mixed membership model using sensor data associated with a plurality of different pieces of factory equipment.

12. The method of claim 11, wherein generating predicted degradation states comprises capturing sequential dependencies between data points within a sequence of sensor data with the hidden Markov model and capturing hierarchical structure present in the sensor data with the mixed membership model.

13. The method of claim 8, wherein generating predicted degradation states comprises generating a posterior predictive distribution of observation states, the observation states representative of stochastic degradation of the piece of factory equipment.

14. A non-transitory computer readable medium configured to store instructions executable by a processor, the computer readable medium comprising:
   instructions executable with the processor to receive a plurality of sensor data from a plurality of sensing parameters of a piece of factory equipment;
   instructions executable with the processor to generate predicted degradation states of the piece of factory equipment, with a first model trained to generate a stochastic degradation model for classification of the predicted degradation states of a particular asset;
   instructions executable with the processor to fit the predicted degradation states to a second model trained to generate a covariate indicative of a failure condition of the piece of factory equipment;
   instructions executable with the processor to supply the covariate to the first model to generate predicted degradation states compensated with the covariate;
   instructions executable with the processor to generate a policy of a maintenance action based on the predicted degradation states to optimize life expectancy of the piece of factory equipment;
   instructions executable with the processor to generate a maintenance/operation schedule based on the policy; and
   instructions executable with the processor to adjust operation of the piece of factory equipment based on the maintenance/operation schedule.

15. The computer readable medium of claim 14, wherein the instructions executable with the processor to supply the covariate to the first model to generate the predicted degradation states compensated with the covariate comprises instructions executable with the processor to supply the covariant as a feedback to the first model for re-generation of the predicted degradation states as compensated degradation states according to the covariant.

16. The computer readable medium of claim 14, wherein the instructions executable with the processor to supply the covariate to the first model to generate the predicted degradation states compensated with the covariate comprises instructions executable with the processor to operate the second model as the first model for re-generation of the predicted degradation states as compensated degradation states according to the covariant.

17. The computer readable medium of claim 14, wherein the instructions executable with the processor to generate predicted degradation states of the piece of factory equipment further comprises instructions executable with the processor to combine a hidden Markov model with a mixed membership model and train the combined hidden Markov model and the mixed membership model using sensor data associated with a plurality of different pieces of factory equipment.

18. The computer readable medium of claim 17, wherein the instructions executable with the processor to generate predicted degradation states comprises instructions executable with the processor to capture sequential dependencies between data points within a sequence of sensor data with the hidden Markov model and capturing hierarchical structure present in the sensor data with the mixed membership model.

19. The computer readable medium of claim 14, wherein the instructions executable with the processor to generate predicted degradation states comprises instructions executable with the processor to generate a posterior predictive distribution of observation states, the observation states representative of stochastic degradation process of the piece of factory equipment.

20. The computer readable medium of claim 14, wherein the predicted degradation states of the piece of factory equipment generated with the first model are sequences of observations generated by the first model that mimic the stochastic failure degradation process of the piece of factory equipment.

* * * * *